United States Patent
Liu

(10) Patent No.: US 11,288,774 B2
(45) Date of Patent: Mar. 29, 2022

(54) IMAGE PROCESSING METHOD AND APPARATUS, STORAGE MEDIUM, AND ELECTRONIC APPARATUS

(71) Applicant: TENCENT TECHNOLOGY (SHENZHEN) COMPANY LIMITED, Shenzhen (CN)

(72) Inventor: Hao Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 84 days.

(21) Appl. No.: 16/582,903

(22) Filed: Sep. 25, 2019

(65) Prior Publication Data
US 2020/0043142 A1 Feb. 6, 2020

Related U.S. Application Data

(63) Continuation of application No. PCT/CN2018/102986, filed on Aug. 29, 2018.

(30) Foreign Application Priority Data

Sep. 13, 2017 (CN) .......................... 201710826678.9

(51) Int. Cl.
*G06T 5/00* (2006.01)
*G06T 3/40* (2006.01)
*G06T 7/529* (2017.01)

(52) U.S. Cl.
CPC ................ *G06T 5/002* (2013.01); *G06T 3/40* (2013.01); *G06T 7/529* (2017.01); *G06T 2207/10024* (2013.01)

(58) Field of Classification Search
None
See application file for complete search history.

(56) References Cited

U.S. PATENT DOCUMENTS 8,035,641 B1 * 10/2011 O'Donnell .............. G06T 15/00
345/420
9,734,551 B1 8/2017 Esteban et al.
(Continued)

FOREIGN PATENT DOCUMENTS

CN 102801908 A 11/2012
CN 105488793 A 4/2016
(Continued)

OTHER PUBLICATIONS

The World Intellectual Property Organization (WIPO) International Search Report for PCT/CN2018/102986 dated Nov. 22, 2018 5 Pages (including translation).
(Continued)

*Primary Examiner* — Aaron M Richer
(74) *Attorney, Agent, or Firm* — Anova Law Group, PLLC

(57) ABSTRACT

This application discloses an image processing method and apparatus, a storage medium, and an electronic apparatus. The image processing method includes performing edge expansion on an object in a scene according to a location parameter to obtain a profile of an expanded object, the location parameter being a relative location parameter of the object in the scene from a viewpoint; identifying a circle of confusion (COC) value of a vertex of the object as a COC value of a corresponding vertex of the profile of the expanded object; determining a color of each pixel of the expanded object according to the COC value of the corresponding vertex and a texture of the object in the scene; and displaying the expanded object based on the color of each pixel.

10 Claims, 8 Drawing Sheets

Texture A: original view COC=1

Texture B: original size, and after a filter is used, a COC range is 3

Texture C: a half of the size, and in combination with the filter, the COC range is 6

Texture D: a quarter of the size, and in combination with the filter, the COC range is 12

(56) References Cited

U.S. PATENT DOCUMENTS

| | | | |
|---|---|---|---|
| 9,955,084 B1* | 4/2018 | Haynold | G06T 5/007 |
| 10,225,485 B1* | 3/2019 | Haynold | G06T 5/008 |
| 2009/0073166 A1* | 3/2009 | Dorbie | G06T 17/20 |
| | | | 345/420 |
| 2012/0307010 A1* | 12/2012 | Evertt | H04N 13/257 |
| | | | 348/46 |
| 2015/0348283 A1* | 12/2015 | Clarberg | G06T 1/20 |
| | | | 345/420 |
| 2016/0269710 A1 | 9/2016 | Wajs | |

FOREIGN PATENT DOCUMENTS

| | | |
|---|---|---|
| CN | 105979165 A | 9/2016 |
| CN | 107133981 A | 9/2017 |

OTHER PUBLICATIONS

The European Patent Office (EPO) The partial supplementary European Search Report for 18856274.8 dated Oct. 12, 2020 12 Pages.

Korean Intellectual Property Office (KIPO) Office Action 1 for 20197028700 dated Dec. 28, 2020 16 Pages (including translation).

Kai Selgrad et al., "Real-time depth of field using multi-layer filtering," Proceedings of the 19th Symposium on Interactive 3D Graphics and Games, I3D'15, Jan. 2015, pp. 121-127. 7 pages.

Todd J Kosloff et al., "Depth of field postprocessing for layered scenes using constant-time rectangle spreading," Graphics Interface 2005: Proceedings; Victoria, British Columbia, May 9-11, 2005, Canadian Information Processing Society, 403 King Street West, Suite 205 Toronto, Ont. M5U 1LS Canada, May 25, 2009, pp. 39-46. 8 pages.

Liu Xin et al., "Depth of field synthesis from sparse views," Computers and Graphics, Elsevier, GB, vol. 55, Nov. 19, 2015, pp. 21-32. 12 pages.

B Pham, "Offset Curves and Surfaces: A Brief Survey," Computer Aided Design, Elsevier Publishers BV., Barking, GB,vol. 24, No. 4, Apr. 1992, pp. 223-229. 7 pages.

Todd Jerome Kosloff et al., "An Algorithm for Rendering Generalized Depth of Field Effects Based on Simulated Heat Diffusion," Electrical Engineering and Computer Sciences University of California at Berkeley (Jan. 24, 2007) 13 pages.

Korean Intellectual Property Office (KIPO) Office Action 1 for 20197028700 dated Jul. 20, 2021 13 pages (including translation).

* cited by examiner

Texture A: original view COC=1

Texture B: original size, and after a filter is used, a COC range is 3

Texture C: a half of the size, and in combination with the filter, the COC range is 6

Texture D: a quarter of the size, and in combination with the filter, the COC range is 12

IMAGE PROCESSING METHOD AND APPARATUS, STORAGE MEDIUM, AND ELECTRONIC APPARATUS

RELATED APPLICATION

This application claims priority to PCT Application No. PCT/CN2018/102986, filed on Aug. 29, 2018, which in turn claims priority to Chinese Patent Application No. 201710826678.9, entitled "IMAGE PROCESSING METHOD AND APPARATUS, STORAGE MEDIUM, AND ELECTRONIC APPARATUS," filed with the China National Intellectual Property Administration on Sep. 13, 2017. The two applications are incorporated by reference in their entirety.

FIELD OF THE TECHNOLOGY

This application relates to the field of image processing, and specifically, to an image processing method and apparatus, a storage medium, and an electronic apparatus.

BACKGROUND OF THE DISCLOSURE

In computer graphics, an ideal pinhole camera (with a lens size of 0) is usually used to project onto a virtual film. Therefore, there is only one transmission path from the scene to the film. If a depth of field effect is desired, approximate simulation needs to be performed on a blur generated by a real lens.

However, in the related technology, the blur texture is sampled and mixed only on the body of the object, and the COC diffusion is not physically performed on pixels, and distortion is generated when the depth is discontinuous, that is, a very hard profile appears at the edge of an object that should be blurred. To obtain accurate diffusion calculation results, a high computing capability of a graphics card is required. This is not suitable for low-end devices.

SUMMARY

The embodiments of this application provide an image processing method and apparatus, a storage medium, and an electronic apparatus, to resolve at least the technical problem that a depth of field display effect is poor caused by an inaccurate image processing method.

According to an aspect of the embodiments of this application, an image processing method is provided. The image processing method includes performing edge expansion on an object in a scene according to a location parameter to obtain a profile of an expanded object, the location parameter being a relative location parameter of the object in the scene from a viewpoint; identifying a circle of confusion (COC) value of a vertex of the object as a COC value of a corresponding vertex of the profile of the expanded object; determining a color of each pixel of the expanded object according to the COC value of the corresponding vertex and a texture of the object in the scene; and displaying the expanded object based on the color of each pixel.

According to another aspect of the embodiments of this application, an image processing apparatus is further provided. The image processing apparatus includes one or more processors, and one or more memories storing program units, the program units being executed by the processor. The program units include an expansion unit, configured to perform edge expansion on an object in a scene according to a location parameter, to obtain a profile of an expanded object, the location parameter being a relative location parameter of the object in the scene from a viewpoint; a first processing unit, configured to use a circle of confusion (COC) value of a vertex of the object as a COC value of a corresponding vertex of the profile of the expanded object; a determining unit, configured to determine a color of each pixel of the expanded object according to the COC value of the corresponding vertex and a texture of the object in the scene; and a displaying unit, configured to display the expanded object based on the color of each pixel.

Another aspect of the present disclosure provides an electronic apparatus, comprising a memory, a processor, and a computer program that is stored in the memory and that is capable of running on the processor to implement the method comprising: performing edge expansion on an object in a scene according to a location parameter to obtain a profile of an expanded object, the location parameter being a relative location parameter of the object in the scene from a viewpoint; identifying a circle of confusion (COC) value of a vertex of the object as a COC value of a corresponding vertex of the profile of the expanded object; determining a color of each pixel of the expanded object according to the COC value of the corresponding vertex and a texture of the object in the scene; and displaying the expanded object based on the color of each pixel.

Another aspect of the present disclosure provides a computer readable medium containing program instructions for image processing. Execution of the program instructions by one or more processors of a computer system causes the one or more processors to implement the steps of: performing edge expansion on an object in a scene according to a location parameter to obtain a profile of an expanded object, the location parameter being a relative location parameter of the object in the scene from a viewpoint; identifying a circle of confusion (COC) value of a vertex of the object as a COC value of a corresponding vertex of the profile of the expanded object; and determining a color of each pixel of the expanded object according to the COC value of the corresponding vertex and a texture of the object in the scene. The one or more processors further implement the step of displaying the expanded object based on the color of each pixel.

In embodiments of this application, the following steps are executed: performing edge expansion on an object in a scene according to a location parameter, to obtain a profile of an expanded object, the location parameter being a relative location parameter of the object in the scene from a viewpoint; using a COC value of a vertex of the object as a COC value of a corresponding vertex of the profile of the expanded object; determining a color of each pixel of the expanded object according to the COC value of the corresponding vertex and a pre-obtained texture of the object in the scene; and displaying the expanded object based on the color of each pixel, so that a display effect is more real by performing edge expansion on the object according to an image depth of field display principle. Embodiments of the present disclosure achieve the technical effect of improving a depth of field display effect, thereby resolving the technical problem related to poor depth of field caused by an inaccurate image processing method.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the figures.

DESCRIPTION OF EMBODIMENTS

Figure 1:
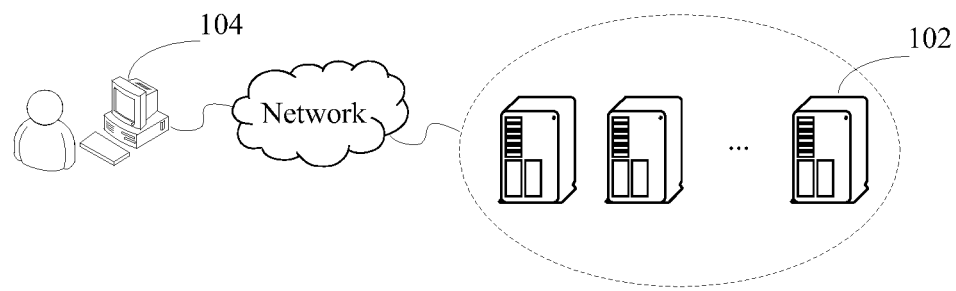
FIG. 1 is a schematic diagram of a hardware environment of an image processing method according to an embodiment of this application.

To make a person skilled in the art better understand solutions of this application, the following clearly and completely describes the technical solutions in the embodiments of this application with reference to the accompanying drawings in the embodiments of this application. Apparently, the described embodiments are merely some rather than all of the embodiments of this application. All other embodiments obtained by a person skilled in the art based on the embodiments of the present application without creative efforts shall fall within the protection scope of the present application.

In the specification, claims, and accompanying drawings of this application, the terms "first", "second", and so on are intended to distinguish between similar objects rather than indicating a specific order. It should be understood that data used in this way can be interchanged in an appropriate case, so that the embodiments of this application that are described herein can be implemented in a sequence other than those sequences illustrated or described herein. Moreover, the terms "include", "comprise", and any variants thereof are intended to cover a non-exclusive inclusion. For example, a process, method, system, product, or device that includes a list of steps or units is not necessarily limited to those steps or units that are clearly listed, but may further include other steps or units not expressly listed or inherent to such a process, method, product, or device.

First, some nouns or terms appearing in a process of describing the embodiments of this application are suitable for the following explanations.

Real-time rendering: a graphics processing unit (GPU for short) is used as a processor, where the image rendering speed of more than 24 frames per second can be considered as effective interaction with the operator.

The object is in clear focus within a range from the lens, and the object is blurrily imaged outside the range (near or far), and this effect is the depth of field. In the photography and film industries, depth of field is usually used to indicate the attention field to the scene and to provide a sense of depth of field. In this field, an area farther than this focus range is usually referred to as a background, an area closer than this range becomes a foreground, and an area within the focus range is referred to as a middle ground.

The depth of field effect is produced by the physical properties of the lens. To converge light passing through the camera lens (or the crystal of the human eye) onto a point on the film (or human retina), the light source needs to be at a specific distance from the lens. A plane at this distance is referred to as a focal plane. An area (less than one point) that is on the film and that anything not at the accurate distance is projected onto is referred to as a COC. The diameter of the COC is proportional to the lens size and the distance from the focal plane. When the deviation distance is sufficiently small, the COC will become smaller than the resolution of the film. The photographer and the cameraman call the range of focus to be focused (imaging is clear); and anything outside this range is blurred (not in focus).

To achieve the depth of field effect, in related technology, there are z-buffer technologies for reverse mapping, which are similar to the forward mapping technology. Images of one color and depth are stored, but mixed colors are not rendered on a screen. Instead, according to the depth value found in the z-buffer, the number of pixels is changed one by one, and a rendered scene is blurred. For pixels with a relatively large difference between a z-value and a focal plane z-value, a larger value is selected as a blur level. This blur method has emerged and has been applied.

In other cases, a plurality of blur textures has been used to approximate a blur required by depth of field. In some methods, a same texture is used for a plurality of times by using different mip levels, while in other methods, a fully new blur texture is created, and sometimes, a good down-sampling filter 3×3 or 5×5 rather than 2×2 is used. According to these methods, three queries are usually performed: an original scene, ¼ of the texture (¼×¼) and 1/16 of the texture (1/16×1/16), and they are mixed according to the z value of the pixel. Instead of making the hardware generate a hierarchical refinement based mipmap, a hardware mipmap generator is usually faster. However, this is at the expense of quality. Another interesting method is to generate a floating point regional sum-up table for color textures by using hardware to replace the mipmap. Although the use of the regional sum-up table can improve the aliasing of two-line interpolation, this technology is quite slow and does not actually produce well-defined results.

Another related technology is a method for achieving a depth of field effect hierarchically based on a circle of confusion (COC for short). First, an object is displayed to achieve a COC hierarchical texture, and then a function relationship between the COC and a distance is defined. Corresponding to the to-be-processed graphics scene division, scene rendering is rendered onto three textures according to the COC division area, the texture color RGB is a normal color of the corresponding pixel, a texture color A stores the COC value of the pixel, and then the hierarchical texture is processed. The hierarchical texture is scaled down, the texture is filtered and scaled down according to a proportion corresponding to the graphics, and the texture is filtered by using a set filter. In the filtering process, the COC comparison is first performed, and the filter may be used for processing. For the beautiful pixels in the filter, it is determined whether the COC is less than or equal to the COC distance in the filter, and if yes, color*COC weight of the pixel is added, where the COC weight is a reciprocal of the number of pixels affected by COC diffusion, assuming that the pixels are uniformly diffused. Then colors are superimposed, and a plurality of pictures is superimposed to obtain a final effect display.

According to an embodiment of this application, a method embodiment of image processing is provided.

In this embodiment, the image processing method may be applied to a hardware environment formed by a server 102 and a terminal 104 shown in FIG. 1. The hardware environment includes a network environment. As shown in FIG. 1, the server 102 is connected to the terminal 104 through a network. The network includes but is not limited to: a wide area network, a metropolitan area network, or a local area network, and the terminal 104 is not limited to a PC, a mobile phone, a tablet computer, or the like. The image processing method in this embodiment of this application may be executed by the server 102, or may be executed by the terminal 104, or may be executed by both the server 102 and the terminal 104. When the terminal 104 executes the image processing method in this embodiment of this application, the method may alternatively be performed by a client installed in the terminal 104.

Figure 2:
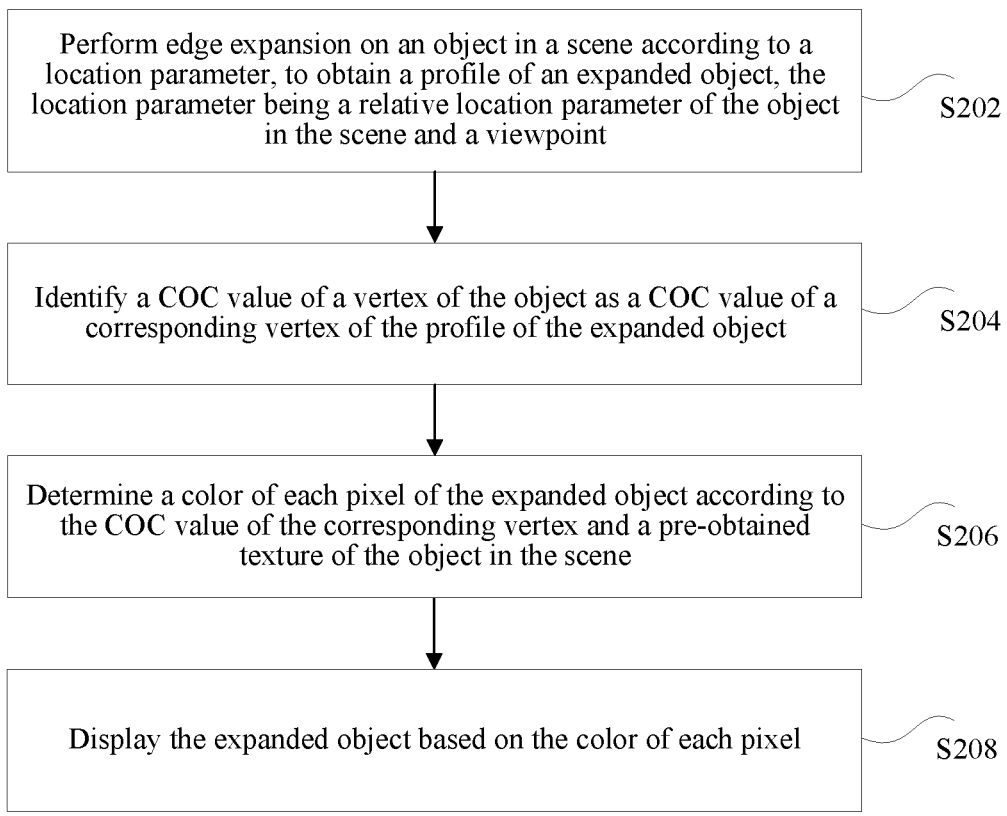
FIG. 2 is a flowchart of an optional image processing method according to an embodiment of this application.

FIG. 2 is a flowchart of an optional image processing method according to an embodiment of this application. As shown in FIG. 2, the method may include the following steps:

Step S202: Perform edge expansion on an object in a scene according to a location parameter, to obtain a profile of an expanded object, the location parameter being a relative location parameter of the object in the scene from a viewpoint.

Step S204: Use a COC value of a vertex of the object as a COC value of a corresponding vertex of the profile of the expanded object.

Step S206: Determine a color of each pixel of the expanded object according to the COC value of the corresponding vertex and a pre-obtained texture of the object in the scene.

Step S208: Display the expanded object based on the color of each pixel.

Step S202 to Step S208 are performed: performing edge expansion on an object in a scene according to a location parameter, to obtain a profile of an expanded object, the location parameter being a relative location parameter of the object in the scene from a viewpoint; using a COC value of a vertex of the object as a COC value of a corresponding vertex of the profile of the expanded object; determining a color of each pixel of the expanded object according to the COC value of the corresponding vertex and a pre-obtained texture of the object in the scene; and displaying the expanded object based on the color of each pixel, so that a display effect is more real by performing edge expansion on the object according to an image depth of field display principle, to achieve the technical effect of improving a depth of field display effect, thereby resolving the technical problem that the depth of field display effect is poor caused by an inaccurate image processing method.

The object can be clearly imaged (focused) within a range from the lens, and the object is blurrily imaged outside the range (near or far), and this effect is the depth of field. In the photography and film industries, depth of field is usually used to indicate the attention field to the scene and to provide a sense of depth of field. In this field, an area farther than this focus range is usually referred to as a background, an area closer than this range becomes a foreground, and an area within the focus range is referred to as a middle ground.

Figure 3:
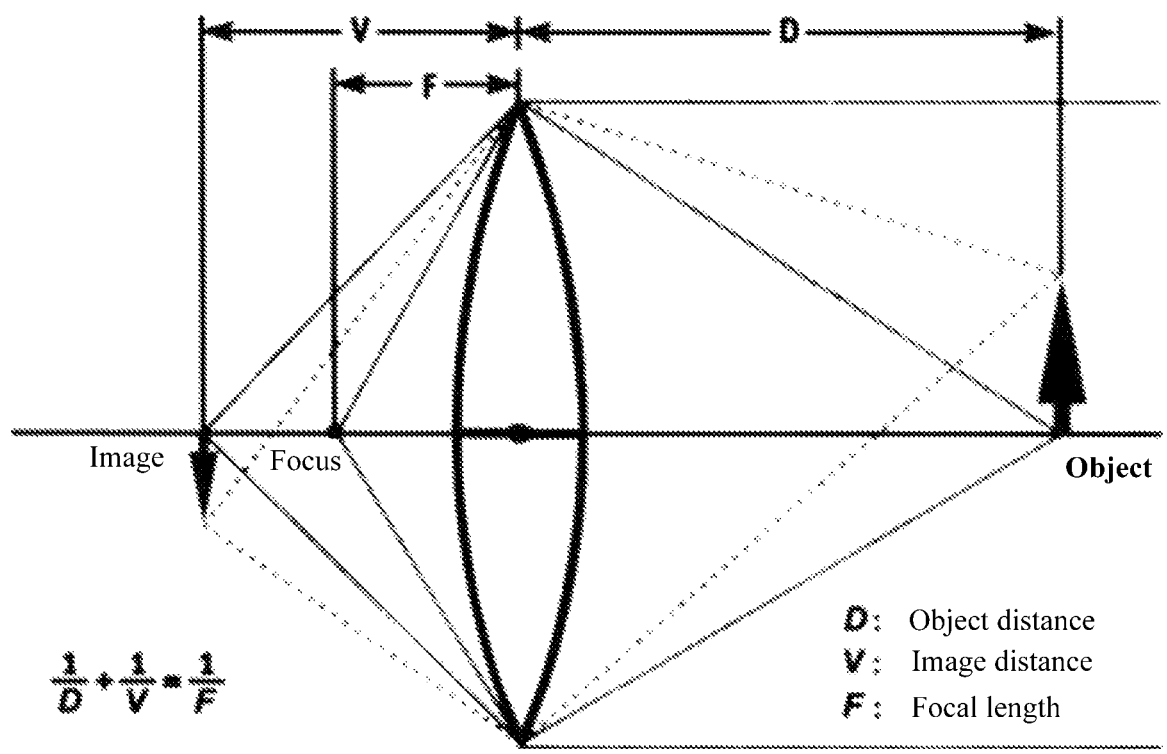
FIG. 3 is a schematic diagram showing that a lens focuses according to an embodiment of this application.
Figure 4:
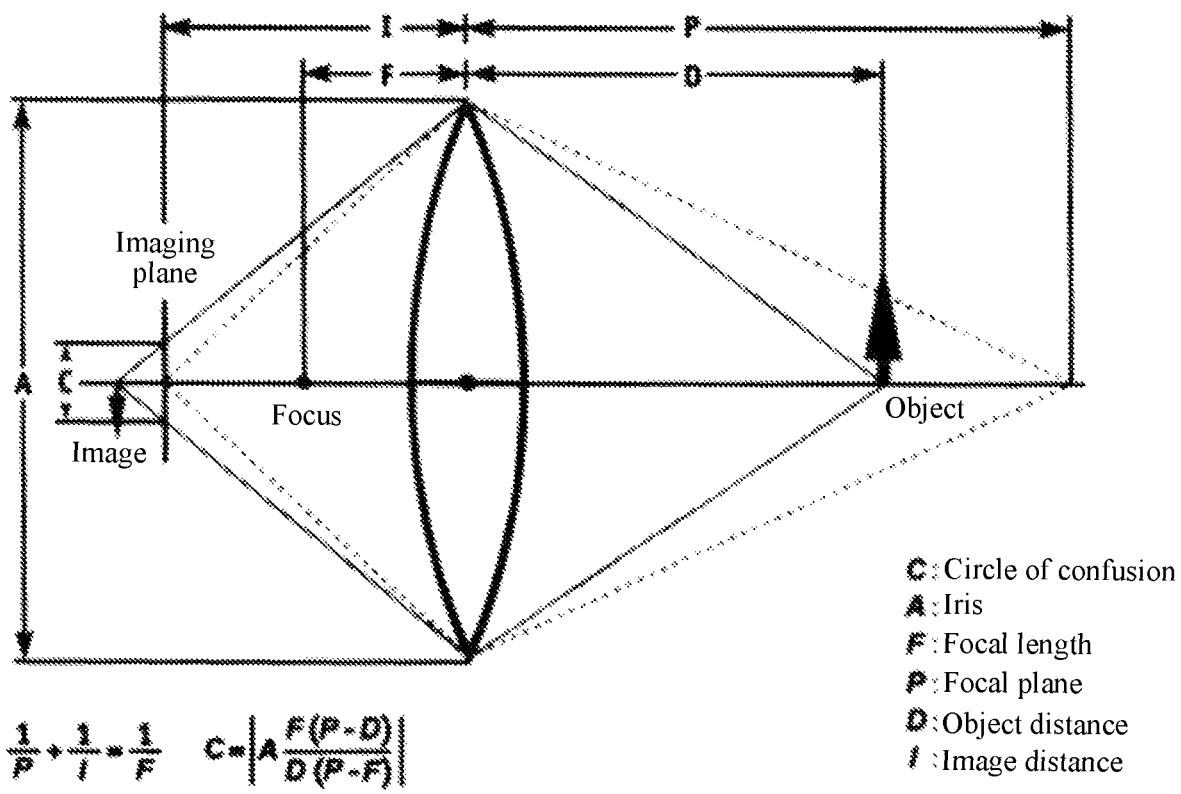
FIG. 4 is a schematic diagram showing that a lens does not focus according to an embodiment of this application.

The depth of field effect is produced by the physical properties of the lens. To converge light passing through the camera lens (or the crystal of the human eye) onto a point on the film (or human retina), the light source needs to be at a specific distance from the lens. FIG. 3 is a schematic diagram showing that a lens focuses according to an embodiment of this application. As shown in FIG. 3, a plane at this distance is referred to as a focal plane. An area (less than one point) that is on the film and that anything not at the accurate distance is projected onto is referred to as a COC. FIG. 4 is a schematic diagram showing that a lens does not focus according to an embodiment of this application. As shown in FIG. 4, the diameter of the COC is proportional to the lens size and the distance from the focal plane. When the deviation distance is sufficiently small, the COC will become smaller than the resolution of the film. The photographer and the cameraman refer to the range of focus as focused (imaging is clear); and anything outside this range is blurred (not in focus).

In this embodiment of this application, the image processing process may be performed in real time on a computer terminal of a player.

In the technical solution provided in step S202, the location parameter is a relative location parameter of the object in the scene and from the viewpoint. The image processing method of this embodiment of this application may be used in image processing of a game scene. For example, in a 3D game scene, a relative location relationship between a player viewpoint and the object is determined at a moment. When the relative location relationship between the player viewpoint and the object is different, for example, the distance or the angle is different, in the different location relationships, depths of field at different locations of the object that can be observed by the player are different. When the eye of the player is far from the object, the edge of the object is greatly blurred, and is not clear. When the eye of the player is relatively close to the object, the edge of the object is relatively clear, and the blurred part is also relatively small. Therefore, edge expansion is performed on the object in the scene according to the location parameter, to obtain the profile of the expanded object. The location parameter may be represented by using a COC value of each point on the object.

In the technical solution provided in step S204, after edge expansion is performed on the object, an obtained object profile has a same number of pixels as that of the original object. For example, the 3D object in the scene is a cube. The original object has eight vertexes, and the expanded object also has eight vertexes. Each vertex corresponds to the vertex of the original object at location. Because the expanded edge is less than the size of the original object, a COC value of the vertex of the original object may be used as a COC value of the vertex corresponding to the profile of the expanded object. The COC value may represent a distance between a point on the current object and the viewpoint. The COC value may also represent a blur degree of the current point.

In the technical solution provided in step S206, a texture of the object in the scene is predetermined. An image of the object in the scene may be sampled and filtered by using a preset filter. Down-sampling is also performed on the original view to obtain a plurality of textures that meet a requirement. A color of each pixel of the expanded object is determined according to the COC value of the corresponding vertex and the plurality of textures. Usually, after the COC value of each vertex is obtained, linear interpolation mixing is performed according to the plurality of textures to determine a color value of each pixel. Each color value may be represented by using an RGB value.

In the technical solution provided in step S208, after colors of all pixels of the expanded object are obtained, the expanded object is drawn according to the colors of the pixels. The process may be rendered in real time. The expanded object may be drawn according to the distance between each pixel in the object and the viewpoint after expansion. An area farther from the focus location is more blurred, and an area closer to the focus location is clearer.

By expanding the edge of the object in the scene and displaying the depth of field effect based on expansion, the display of the depth of field effect can be made closer to the image actually seen by the human eye, especially in a high quality game, in this embodiment, based on the reversely mapped z-buffer depth of field, the depth of field effect can be extremely accurate and efficient through COC layering and diffusion.

In one embodiment, before the color of each pixel of the expanded object is determined according to the COC value of the corresponding vertex and the pre-obtained texture of the object in the scene, a view of the object in the scene is down-sampled, to obtain a plurality of target views, sizes of the plurality of target views being different; and the plurality of target views are filtered respectively by using a plurality of preset filters, to obtain a plurality of textures, the textures being textures of the object in the scene.

By down-sampling a view of the object in the scene, an image of fewer pixels may be obtained. Images of different sizes may be obtained according to different down-sampling values. Images of different sizes are filtered by using a preset COC filter, to obtain textures of different sizes and different COC values. The textures may be used as standard values for sampling during subsequent image processing.

In one embodiment, the plurality of preset filters include a first filter, a second filter, a third filter, and a fourth filter, the plurality of target views include a first target view, a second target view, a third target view, and a fourth target view, and before the color of each pixel of the expanded object is determined according to the COC value of the corresponding vertex and the pre-obtained texture of the object in the scene, a first texture of the object in the scene is obtained by using the first filter and down-sampling, a COC value of the first texture being 1, and a size of the first target view being the same as an original view; a second texture of the object in the scene is obtained by using the second filter and down-sampling, a COC value of the second texture being 3, and a size of the second target view being the same as the original view; a third texture of the object in the scene is obtained by using the third filter and down-sampling, a COC value of the third texture being 6, and a size of the third target view being a half of the original view; and a fourth texture of the object in the scene is obtained by using the fourth filter and down-sampling, a COC value of the fourth texture being 12, and a size of the fourth target view being a quarter of the original view.

There may be four pre-obtained textures of the object in the scene. The four textures may be obtained based on different COC values and different sampling values. In addition to four texture maps obtained by processing in this embodiment of this application, more texture maps may also be obtained for use during linear interpolation mixing.

In one embodiment, the performing edge expansion on an object in a scene according to a location parameter, to obtain a profile of an expanded object may be: traversing all triangular elements of the object in the scene; storing three edges of the triangular element facing a viewpoint direction into a preset stack; in a case that a duplicate edge exists in the stack, deleting the duplicate edge, to obtain all edges facing the viewpoint direction; and projecting the all edges facing the viewpoint direction outward according to the location parameter, to form an expanded edge, and obtain the profile of the expanded object.

In three-dimensional (3D) image processing, image processing is performed on all objects by using a triangle as a processing unit. All triangular elements of the object in the scene are traversed, to find a triangular element facing a viewpoint direction. Three edges of the triangular element facing the viewpoint direction are all stored into a preset stack. Because each edge is shared by two triangles, there are a lot of duplicate edges in the stack. If it is determined that there are duplicate edges in the stack, the duplicate edges are deleted once, to obtain unduplicated edges. All edges facing the viewpoint direction are projected outward according to the location parameter to form the expanded edge, to form the profile of the expanded object.

In one embodiment, the projecting the all edges facing the viewpoint direction outward according to the location parameter, to form an expanded edge, and obtain the profile of the expanded object may be: determining a length of the expanded edge according to a COC value of each vertex facing the viewpoint direction in the location parameter; and projecting the all edges facing the viewpoint direction outward according to the length of the expanded edge, to form the expanded edge, and obtain the profile of the expanded object.

For each vertex in the object, there is a determined COC value. An area with a larger COC value indicates a larger length of the expanded edge, and a more blurred visual effect. An area with a smaller COC value indicates a smaller length of the expanded edge, and a clearer visual effect. Edges of all surfaces facing the viewpoint direction are visible, and all edges back to the viewpoint direction are invisible. During image display, only points facing the viewpoint direction need to be displayed. Edges facing the viewpoint direction are projected outward to form the expanded edge, to obtain the profile of the expanded object.

In high quality games, the depth of field effect that simulates human eye feelings is increasingly appreciated by players. In this method, extremely high accuracy and efficiency are achieved through COC layering and diffusion based on the reversely mapped z-buffer depth of field.

This application further provides one embodiment. The technical solution of this embodiment of this application is described below with reference to the optional embodiment.

Figure 5:
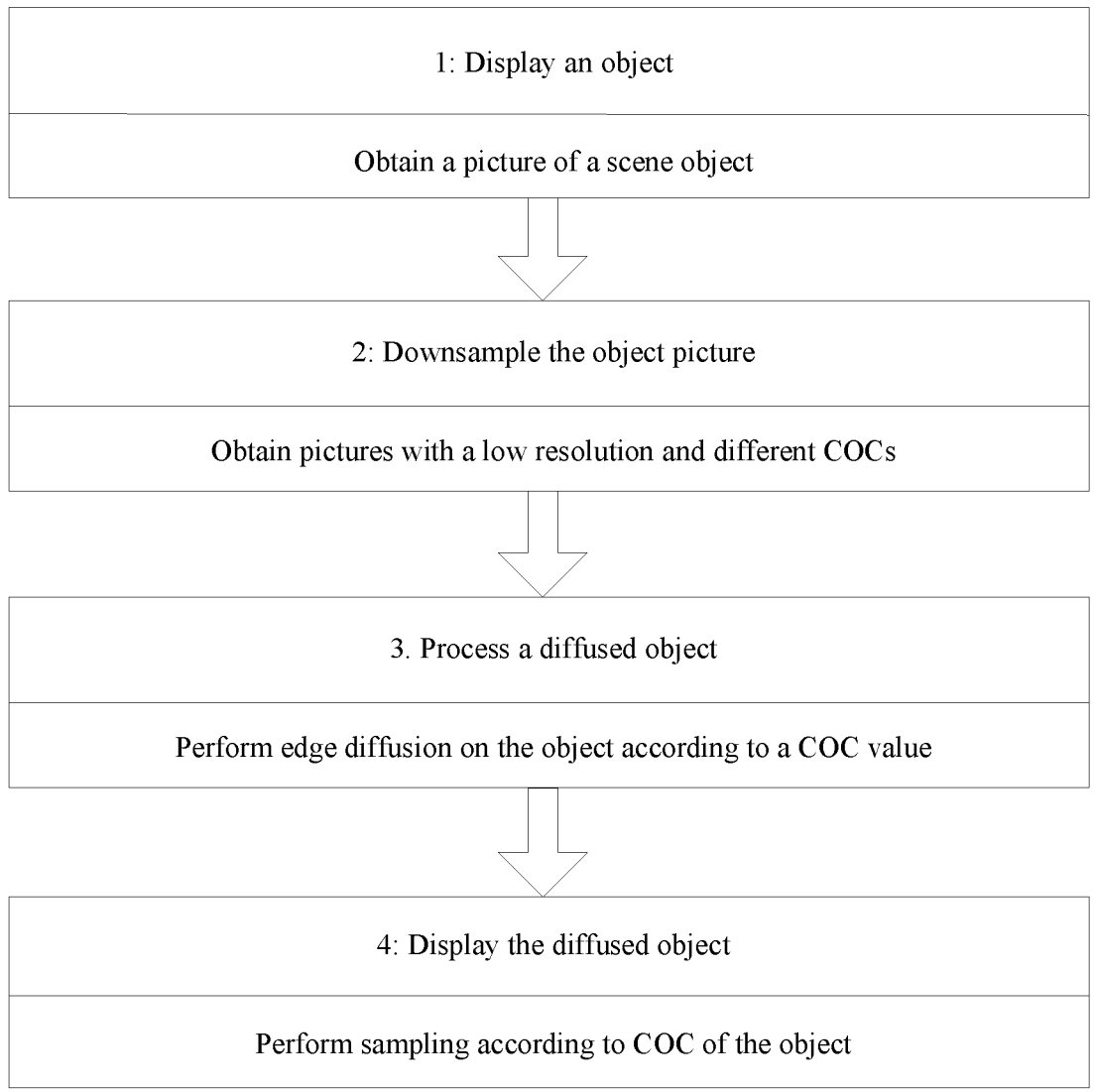
FIG. 5 is a flowchart of an optional image processing method according to an embodiment of this application.

FIG. 5 is a flowchart of an optional image processing method according to an embodiment of this application. As shown in FIG. 5, the method may include the following steps:

1: Display an object, to obtain a picture of a scene object.

2: Down-sample the object picture, to obtain pictures with a low resolution and different COCs.

3. Process a diffused object, and perform edge diffusion on the object according to a COC value.

4: Display the diffused object, and perform sampling according to COC of the object.

In some embodiments, the object is displayed.

Figure 6:
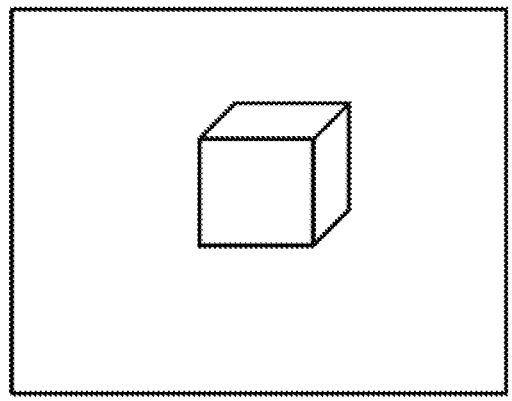
FIG. 6 is a schematic diagram of a scene picture according to an embodiment of this application.

FIG. 6 is a schematic diagram of a scene picture according to an embodiment of this application. As shown in FIG. 6, an object is normally rendered to obtain a picture of the scene picture, and the obtained picture of the scene picture may be temporarily stored in a cache.

The object picture is down-sampled.

Figure 7:
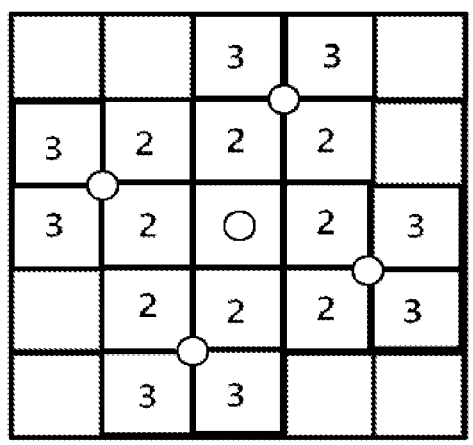
FIG. 7 is a schematic diagram of a filter of COC=3 according to an embodiment of this application.

FIG. 7 is a schematic diagram of a filter of COC=3 according to an embodiment of this application. As shown in FIG. 7, in the filter of COC=3, a maximum value is 3, and convolution calculation may be performed on the original view of the object picture in the scene by using the filter of COC=3. The filter is used to perform linear filtering during sampling, so that data of 17 sampling points can be obtained through five times of sampling (corresponding to small circle locations in the figure). A COC range of the filter is 3. The values of the COC may be other values in addition to the values shown in FIG. 7. For the value setting of the COC filter, combinations that can be conceived of by a person skilled in the art are within the protection scope of this application.

Figure 8:
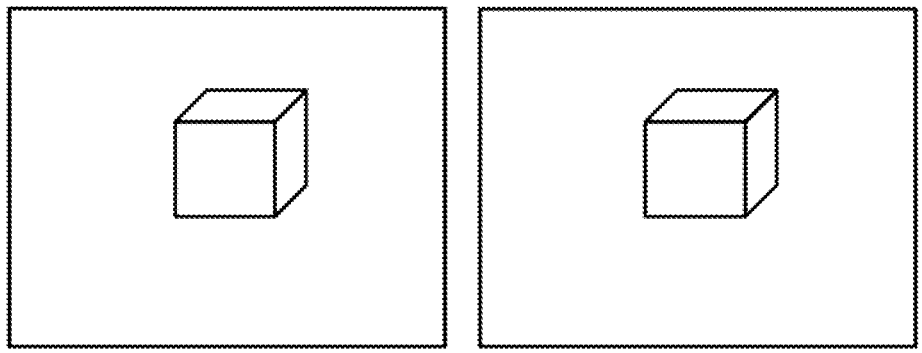
FIG. 8 is a schematic diagram of four textures according to an embodiment of this application.

FIG. 8 is a schematic diagram of four textures according to an embodiment of this application. As shown in FIG. 8, by scaling down the original view and COC filter processing, four textures in the figure can be obtained, and the textures support different COC ranges. COC=1 is used in FIG. A, and a texture A is an original view. The size of the texture B is the original size, and after a filter is used, a COC range is 3. The size of the texture C is a half of the original view, and in combination with the filter, the COC range is 6. The size of the texture D is a quarter of the original view, and in combination with the filter, the COC range is 12.

A diffused object is processed, and edge diffusion is performed on the object according to a COC value.

Figure 9:
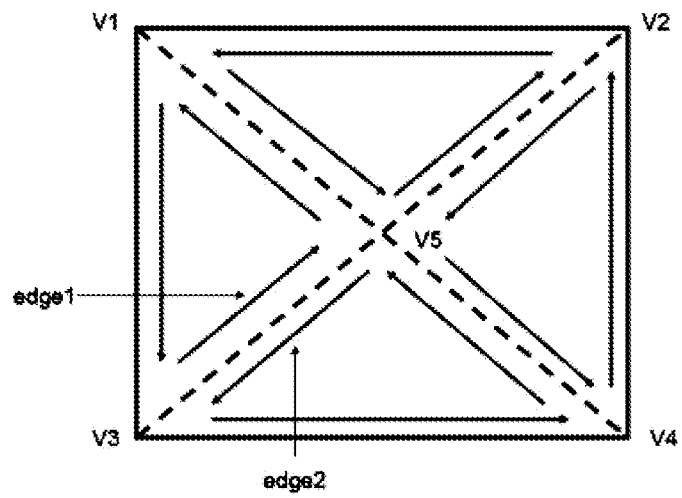
FIG. 9 is a schematic diagram of a triangular element according to an embodiment of this application.

FIG. 9 is a schematic diagram of a triangular element according to an embodiment of this application. As shown in FIG. 9, for a polygon consisting of four triangles, assuming that the viewpoint is located at a location of the player's head, the peripheral circle of solid line is the edge. Four inner redundant edges (dashed lines) need to be removed from original data. An optional implementation is as follows:

All triangles of the model are traversed.

A vector point multiplication dot 3 (Viewpoint_direction, triangle_normal) is calculated, to obtain a point multiplication result, and the result is used to determine whether the triangle faces a player (dot 3>0, visible) or is back to the player (dot 3<0, invisible).

For a triangle facing a player, three edges are all pressed into a stack, and are compared with edges in the stack. If duplicate edges (an edge 1 and an edge 2) are found, the edges are deleted.

After all edges of all triangles are detected, remaining edges in the stack are lower edges facing the location of the player.

Figure 10:
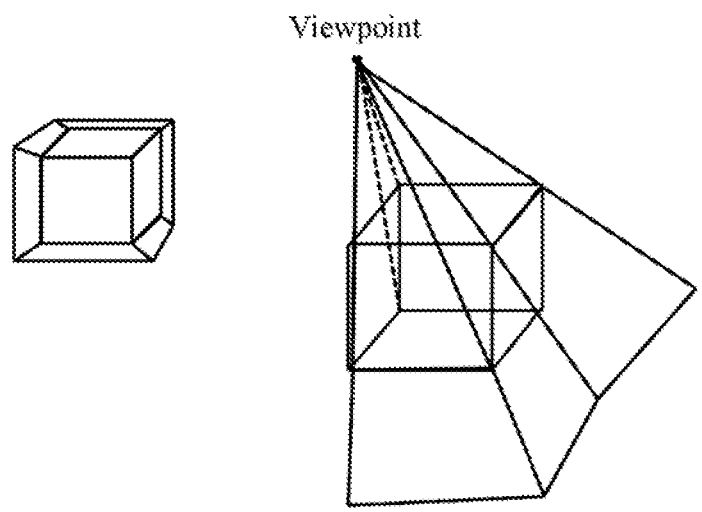
FIG. 10 is a schematic diagram of a viewpoint location and an expanded edge according to an embodiment of this application.

FIG. 10 is a schematic diagram of a viewpoint location and an expanded edge according to an embodiment of this application. As shown in FIG. 10, the edge lines are projected out by using a CPU according to a viewpoint direction, to form edge expansion. If the number of edges of the profile is n, 2n triangles need to be dynamically generated. The length of the edge expansion is subject to a COC value of a corresponding vertex.

Figure 11:
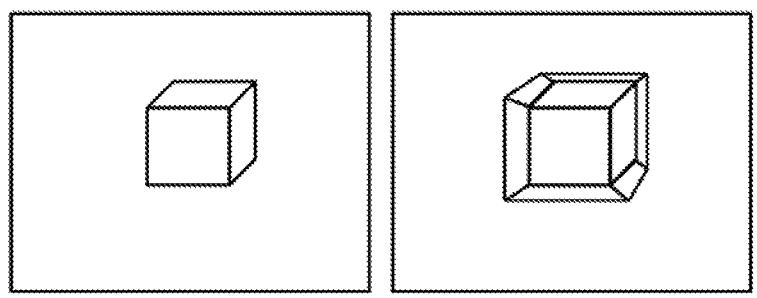
FIG. 11 is a schematic diagram of an original view and an object after edge expansion according to an embodiment of this application.

FIG. 11 is a schematic diagram of an original view and an object after edge expansion according to an embodiment of this application. As shown in FIG. 11, compared with the original view, the object after the edge expansion has an expanded edge, and an expansion length in each direction is related to a COC value of a corresponding vertex.

A diffused object is displayed, namely, an expanded object is displayed.

Sampling is performed according to a COC value of the object, and a COC value of a vertex on which edge expansion is performed is equal to a COC value of a vertex of an expansion source.

Figure 12:
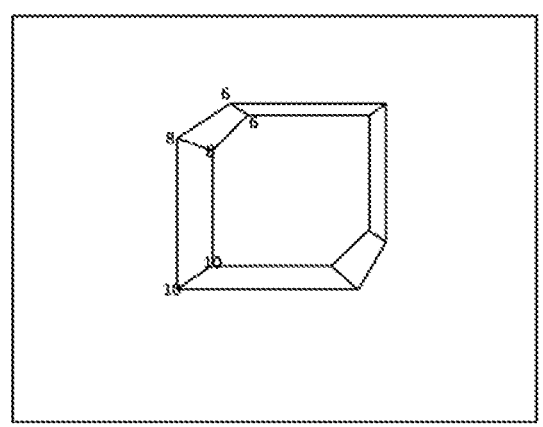
FIG. 12 is a schematic diagram of a COC value of edge expansion according to an embodiment of this application.

FIG. 12 is a schematic diagram of a COC value of edge expansion according to an embodiment of this application. As shown in FIG. 12, when a diffused object is finally drawn, during pixel rendering, a texture A to a texture D are sampled according to a COC value of itself. For example, if COC of this pixel is 10, the texture C (a COC range 6) and the texture D (a COC range 12) are sampled, and linear interpolation mixing is performed on them, and the final color is texture $C*(12-10)/(12-6)$+texture $D*(10-6)/(12-6)$. During color calculation, an RGB value is calculated for each pixel, to obtain a color of each pixel, and then an image of the expanded object is rendered and drawn according to the calculated color, so that the visual effect is closer to the real visual effect, thereby improving the visual effect of the game scene, and improving user experience. Upon test, by using the technical solution of this embodiment of this application, an approximate depth of field effect can be achieved on low-end display devices.

In the technical solution of this embodiment of this application, COC division and edge expansion are performed on an object based on a geometrical space, to quickly obtain an approximate depth of field effect, so that a case of deep mutation can be processed. For example, a visual effect of high quality depth of field display can be obtained on an edge of the object.

For ease of description, the foregoing method embodiments are stated as a series of action combinations. However, a person skilled in the art should know that this application is not limited to the sequence of the described actions because according to this application, some steps may use another sequence or may be simultaneously performed. In addition, a person skilled in the art should also know that all the embodiments described in this specification are optional embodiments, and the related actions and modules are not necessarily required in this application.

Based on the foregoing descriptions of the embodiments, a person skilled in the art may clearly understand that the method in the foregoing embodiments may be implemented by software in addition to a necessary universal hardware platform or by hardware only. However, the former is a better implementation in most cases. Based on such an understanding, the technical solutions of this application essentially or the part contributing to the related technology may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in embodiments of this application.

Figure 13:
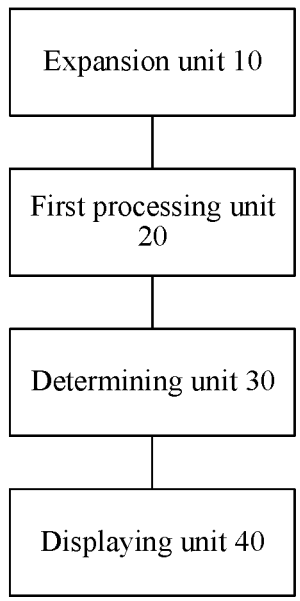
FIG. 13 is a schematic diagram of an optional image processing apparatus according to an embodiment of this application.

According to an embodiment of this application, an image processing apparatus configured to implement the foregoing image processing method is further provided. FIG. 13 is a schematic diagram of an optional image processing apparatus according to an embodiment of this application. As shown in FIG. 13, the apparatus may include: an expansion unit 10, configured to perform edge expansion on an object in a scene according to a location parameter, to obtain a profile of an expanded object, the location parameter being a relative location parameter of the object in the scene from a viewpoint; a first processing unit 20, configured to use a circle of confusion (COC) value of a vertex of the object as a COC value of a corresponding vertex of the profile of the expanded object; a determining unit 30, configured to determine a color of each pixel of the expanded object according to the COC value of the corresponding vertex and a pre-obtained texture of the object in the scene; and a displaying unit 40, configured to display the expanded object based on the color of each pixel.

The expansion unit 10 in this embodiment may be configured to perform step S202 in this embodiment of this application, the first processing unit 20 in this embodiment may be configured to perform step S204 in this embodiment of this application, the determining unit 30 in this embodiment may be configured to perform step S206 in this embodiment of this application, and the displaying unit 40 in this embodiment may be configured to perform step S208 in this embodiment of this application.

It is to be noted herein that examples and application scenarios implemented by the foregoing modules and corresponding steps are the same but are not limited to the content disclosed in the foregoing embodiments. The foregoing modules may be run in the hardware environment shown in FIG. 1 as a part of the apparatus, and may be implemented through software, or may be implemented through hardware.

By using the foregoing modules, the technical problem that the depth of field display effect is poor caused by an inaccurate image processing method can be resolved, thereby achieving the technical effect of making the display effect more real.

In one embodiment, the apparatus further includes: a sampling unit, configured to: before the color of each pixel of the expanded object is determined according to the COC value of the corresponding vertex and the pre-obtained texture of the object in the scene, down-sample a view of the object in the scene, to obtain a plurality of target views, sizes of the plurality of target views being different; and a filtering unit, configured to filter the plurality of target views respectively by using a plurality of preset filters, to obtain a plurality of textures, the textures being textures of the object in the scene.

In one embodiment, the apparatus further includes: a second processing unit, configured to: before the color of each pixel of the expanded object is determined according to the COC value of the corresponding vertex and the pre-obtained texture of the object in the scene, obtain a first texture of the object in the scene by using the first filter and down-sampling, a COC value of the first texture being 1, and a size of the first target view being the same as an original view; the second processing unit is further configured to obtain a second texture of the object in the scene by using the second filter and down-sampling, a COC value of the second texture being 3, and a size of the second target view being the same as the original view; the second processing unit is further configured to obtain a third texture of the object in the scene by using the third filter and down-sampling, a COC value of the third texture being 6, and a size of the third target view being a half of the original view; and the second processing unit is further configured to obtain a fourth texture of the object in the scene by using the fourth filter and down-sampling, a COC value of the fourth texture being 12, and a size of the fourth target view being a quarter of the original view.

In one embodiment, the expansion unit 10 includes: a traversing module, configured to traverse all triangular elements of the object in the scene; a storage module, configured to store three edges of the triangular element facing a viewpoint direction into a preset stack; a deletion module, configured to: in a case that a duplicate edge exists in the stack, delete the duplicate edge, to obtain all edges facing the viewpoint direction; and an expansion module, configured to project the all edges facing the viewpoint direction outward according to the location parameter, to form an expanded edge, and obtain the profile of the expanded object.

In one embodiment, the expansion module includes: a determining submodule, configured to determine a length of the expanded edge according to a COC value of each vertex facing the viewpoint direction in the location parameter; and an expansion submodule, configured to project the all edges facing the viewpoint direction outward according to the length of the expanded edge, to form the expanded edge, and obtain the profile of the expanded object.

It is to be noted herein that examples and application scenarios implemented by the foregoing modules and corresponding steps are the same but are not limited to the content disclosed in the foregoing embodiments. The foregoing modules may be run in the hardware environment shown in FIG. 1 as a part of the apparatus, and may be implemented through software, or may be implemented through hardware. The hardware environment includes a network environment.

Figure 14:
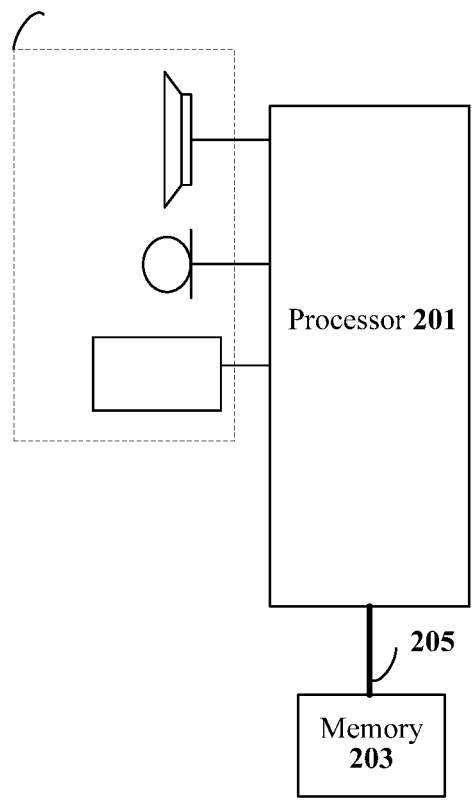
FIG. 14 is a structural block diagram of an electronic apparatus according to an embodiment of this application.

According to an embodiment of this application, an electronic apparatus configured to implement the foregoing image processing method is further provided. As shown in FIG. 14, the electronic apparatus includes:

1) a processor; and
2) a memory.

FIG. 14 is a structural block diagram of an electronic apparatus according to an embodiment of this application. As shown in FIG. 14, the electronic apparatus may include: one or more (where only one is shown) processors 201, a memory 203, and a transmission apparatus 205 (for example, the sending apparatus in the foregoing embodiment). As shown in FIG. 14, the electronic apparatus may further include an input/output device 207.

The memory 203 may be configured to store a software program and module, for example, a program instruction/functional module or submodule corresponding to the image processing method and apparatus in an embodiment of this application. The processor 201 runs the software program and module stored in the memory 203, to implement various functional applications and data processing, that is, implement the foregoing image processing method. The memory 203 may include a high-speed random memory, and may also include a nonvolatile memory such as one or more magnetic storage apparatuses, a flash memory, or another nonvolatile solid-state memory. In some examples, the memory 203 may further include memories remotely disposed relative to the processor 201, and these remote memories may be connected to an electronic apparatus through a network. Examples of the network include, but are not limited to, the Internet, an intranet, a local area network, a mobile communications network, and a combination thereof.

The transmission apparatus 205 is configured to receive or send data through a network, and may further be used for data transmission between the processor and the memory. Specific examples of the foregoing network may include a wired network and a wireless network. In an example, the transmission apparatus 205 includes a network interface controller (NIC) that may be connected to another network device and a router by using a network cable, thereby communicating with the Internet or a local area network. In an example, the transmission apparatus 205 is a radio frequency (RF) module, and is configured to wirelessly communicate with the Internet.

In some embodiments, the memory 203 is configured to store an application program.

The processor 201 may invoke the application program stored in the memory 203 by using the transmission apparatus 205, to execute the following steps: performing edge expansion on an object in a scene according to a location parameter, to obtain a profile of an expanded object, the location parameter being a relative location parameter of the object in the scene from a viewpoint; using a COC value of a vertex of the object as a COC value of a corresponding vertex of the profile of the expanded object; determining a color of each pixel of the expanded object according to the COC value of the corresponding vertex and a pre-obtained texture of the object in the scene; and displaying the expanded object based on the color of each pixel.

The processor 201 is further configured to execute the following steps: down-sampling a view of the object in the scene, to obtain a plurality of target views, sizes of the plurality of target views being different; and filtering the plurality of target views respectively by using a plurality of preset filters, to obtain a plurality of textures, the textures being textures of the object in the scene.

The processor 201 is further configured to execute the following steps: obtaining a first texture of the object in the scene by using the first filter and down-sampling, a COC value of the first texture being 1, and a size of the first target view being the same as an original view; obtaining a second texture of the object in the scene by using the second filter and down-sampling, a COC value of the second texture being 3, and a size of the second target view being the same as the original view; obtaining a third texture of the object in the scene by using the third filter and down-sampling, a COC value of the third texture being 6, and a size of the third target view being a half of the original view; and obtaining a fourth texture of the object in the scene by using the fourth filter and down-sampling, a COC value of the fourth texture being 12, and a size of the fourth target view being a quarter of the original view.

The processor 201 is further configured to execute the following steps: traversing all triangular elements of the object in the scene; storing three edges of the triangular element facing a viewpoint direction into a preset stack; in a case that a duplicate edge exists in the stack, deleting the duplicate edge, to obtain all edges facing the viewpoint direction; and projecting the all edges facing the viewpoint direction outward according to the location parameter, to form an expanded edge, and obtain the profile of the expanded object.

The processor 201 is further configured to execute the following steps: determining a length of the expanded edge according to a COC value of each vertex facing the viewpoint direction in the location parameter; and projecting the all edges facing the viewpoint direction outward according to the length of the expanded edge, to form the expanded edge, and obtain the profile of the expanded object.

In this embodiment of this application, the following steps are executed: performing edge expansion on an object in a scene according to a location parameter, to obtain a profile of an expanded object, the location parameter being a relative location parameter of the object in the scene from a viewpoint; using a COC value of a vertex of the object as a COC value of a corresponding vertex of the profile of the expanded object; determining a color of each pixel of the expanded object according to the COC value of the corresponding vertex and a pre-obtained texture of the object in the scene; and displaying the expanded object based on the color of each pixel, so that a display effect is more real by performing edge expansion on the object according to an image depth of field display principle, to achieve the technical effect of improving a depth of field display effect, thereby resolving the technical problem that the depth of field display effect is poor caused by an inaccurate image processing method.

In some embodiments, refer to the examples described in the foregoing embodiments for specific examples in this embodiment. Details are not described in this embodiment.

A person of ordinary skill in the art may understand that, the structure shown in FIG. 14 is only schematic. The electronic apparatus may be an electronic apparatus device such as a smartphone (such as an Android mobile phone or an iOS mobile phone), a tablet computer, a palmtop computer, a mobile Internet device (MID), or a PAD. FIG. 14 does not limit the structure of the foregoing electronic apparatus. For example, the electronic apparatus may further include more or fewer components (such as a network interface and a display apparatus) than those shown in FIG. 14, or have a configuration different from that shown in FIG. 14.

A person of ordinary skill in the art may understand that all or some of the steps in the methods of the foregoing embodiments may be implemented by a program instructing relevant hardware of the electronic apparatus device. The program may be stored in a computer readable storage medium. The storage medium may be a flash disk, a read-only memory (ROM), a random access memory (RAM), a magnetic disk, or an optical disc.

An embodiment of this application further provides a storage medium. In some embodiments, in this embodiment, the storage medium stores a computer program. The computer program, when run, is configured to perform the image processing method.

In some embodiments, in this embodiment, the storage medium may be located in at least one of a plurality network devices in the network shown in the foregoing embodiments.

In some embodiments, in this embodiment, the storage medium is configured to store program code for performing the following steps:

S1: Perform edge expansion on an object in a scene according to a location parameter, to obtain a profile of an expanded object, the location parameter being a relative location parameter of the object in the scene from a viewpoint.

S2: Use a COC value of a vertex of the object as a COC value of a corresponding vertex of the profile of the expanded object.

S3: Determine a color of each pixel of the expanded object according to the COC value of the corresponding vertex and a pre-obtained texture of the object in the scene.

S4: Display the expanded object based on the color of each pixel.

In some embodiments, the storage medium is further configured to store program code for executing the following steps: down-sampling a view of the object in the scene, to obtain a plurality of target views, sizes of the plurality of target views being different; and filtering the plurality of target views respectively by using a plurality of preset filters, to obtain a plurality of textures, the textures being textures of the object in the scene.

In some embodiments, the storage medium is further configured to store program code for executing the following steps: obtaining a first texture of the object in the scene by using the first filter and down-sampling, a COC value of the first texture being 1, and a size of the first target view being the same as an original view; obtaining a second texture of the object in the scene by using the second filter and down-sampling, a COC value of the second texture being 3, and a size of the second target view being the same as the original view; obtaining a third texture of the object in the scene by using the third filter and down-sampling, a COC value of the third texture being 6, and a size of the third target view being a half of the original view; and obtaining a fourth texture of the object in the scene by using the fourth filter and down-sampling, a COC value of the fourth texture being 12, and a size of the fourth target view being a quarter of the original view.

In some embodiments, the storage medium is further configured to store program code for executing the following steps: traversing all triangular elements of the object in the scene; storing three edges of the triangular element facing a viewpoint direction into a preset stack; in a case that a duplicate edge exists in the stack, deleting the duplicate edge, to obtain all edges facing the viewpoint direction; and projecting the all edges facing the viewpoint direction outward according to the location parameter, to form an expanded edge, and obtain the profile of the expanded object.

In some embodiments, the storage medium is further configured to store program code for executing the following steps: determining a length of the expanded edge according to a COC value of each vertex facing the viewpoint direction in the location parameter; and projecting the all edges facing the viewpoint direction outward according to the length of the expanded edge, to form the expanded edge, and obtain the profile of the expanded object.

In some embodiments, refer to the examples described in the foregoing embodiments for specific examples in this embodiment. Details are not described in this embodiment.

In some embodiments, in this embodiment, the storage medium may include, but is not limited to: any medium that can store program code, such as a USB flash drive, a read only memory (ROM), a random access memory (RAM), a removable hard disk, a magnetic disk, or an optical disc.

The sequence numbers of the foregoing embodiments of this application are merely for description purpose and do not indicate the preference of the embodiments.

If the integrated units in the foregoing embodiments are implemented in a form of software functional units and are sold or used as an independent product, the units may be stored in a computer readable storage medium. Based on such understanding, the technical solutions of this application essentially, or some contributing to the related technology, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in embodiments of this application.

In the foregoing embodiments of this application, descriptions of the embodiments have different emphases, and as for parts that are not described in detail in one embodiment, reference can be made to the relevant descriptions of the other embodiments.

In the several embodiments provided in the present application, it should be understood that the disclosed client may be implemented in other manners. The described apparatus embodiments are merely schematic. For example, division of the units is merely division of logic functions, and there may be another division manner during actual implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in embodiments of this application may be integrated into one processing unit, or each of the units may exist alone physically, or two or more units may be integrated into one unit. The integrated units may be implemented in a form of hardware or may be implemented in a form of a software functional unit.

The above descriptions are merely optional implementations of this application, and a person of ordinary skill in the art can make various improvements and refinements without departing from the spirit of this application. All such modifications and refinements should also be intended to be covered by this application.

What is claimed is:

1. An image processing method, comprising:
performing edge expansion on an object in a scene according to a location parameter to obtain a profile of an expanded object, the location parameter being a relative location parameter of the object in the scene from a viewpoint, by:
traversing all triangular elements of the object in the scene;
storing three edges of the triangular elements facing a viewpoint direction into a stack;
when a duplicate edge exists in the stack, deleting the duplicate edge, to obtain all edges facing the viewpoint direction; and
projecting the all edges facing the viewpoint direction outward according to the location parameter, to form an expanded edge and obtain the profile of the expanded object;
identifying a circle of confusion (COC) value of a vertex of the object as a COC value of a corresponding vertex of the profile of the expanded object;
down-sampling a view of the object in the scene, to obtain a first target view and a second target view, a size of the first target view being different than a size of the second target view; and
obtaining a first texture of the object in the first target view by using a first filter, obtaining a second texture of the object in the second target view by using a second filter, the first filter being different than the second filter, and a COC value of the first texture being different than a COC value of the second texture;
determining a color of each pixel of the expanded object according to the COC value of the corresponding vertex and the first texture and the second texture of the object; and displaying the expanded object based on the color of each pixel.

2. The method according to claim 1, wherein the projecting the all edges facing the viewpoint direction outward according to the location parameter, to form an expanded edge, and obtain the profile of the expanded object comprises:

determining a length of the expanded edge according to a COC value of each vertex facing the viewpoint direction in the location parameter; and projecting the all edges facing the viewpoint direction outward according to the length of the expanded edge, to form the expanded edge, and obtain the profile of the expanded object.

3. The method according to claim 1, wherein the COC value of the first texture is 1 and the size of the first target view is the same as an original view, and:

the COC value of the second texture is 6 and the size of the second target view is a half of the original view; or the COC value of the second texture is 12 and the size of the second target view is a quarter of the original view.

4. The method according to claim 1, wherein the COC value of the first texture is 3 and the size of the first target view is the same as an original view, and:

the COC value of the second texture is 6 and the size of the second target view is a half of the original view; or the COC value of the second texture is 12 and the size of the second target view is a quarter of the original view.

5. The method according to claim 1, wherein the COC value of the first texture is 6 and the size of the first target view is a half of an original view, and the COC value of the second texture is 12 and the size of the second target view is a quarter of the original view.

6. An image processing apparatus, comprising: one or more memories; and one or more processors coupled to the one or memories and configured to perform:

performing edge expansion on an object in a scene according to a location parameter, to obtain a profile of an expanded object, the location parameter being a relative location parameter of the object in the scene from a viewpoint, by:

traversing all triangular elements of the object in the scene;

storing three edges of the triangular elements facing a viewpoint direction into a stack;

when a duplicate edge exists in the stack, deleting the duplicate edge, to obtain all edges facing the viewpoint direction; and projecting the all edges facing the viewpoint direction outward according to the location parameter, to form an expanded edge and obtain the profile of the expanded object;

identifying a circle of confusion (COC) value of a vertex of the object as a COC value of a corresponding vertex of the profile of the expanded object;

down-sampling a view of the object in the scene, to obtain a first target view and a second target view, a size of the first target view being different than a size of the second target view; and obtaining a first texture of the object in the first target view by using a first filter, obtaining a second texture of the object in the second target view by using a second filter, the first filter being different than the second filter, and a COC value of the first texture being different than a COC value of the second texture;

determining a color of each pixel of the expanded object according to the COC value of the corresponding vertex and the first texture and the second texture of the object; and displaying the expanded object based on the color of each pixel.

7. The apparatus according to claim 6, wherein the one or more processors are further configured to perform:

determining a length of the expanded edge according to a COC value of each vertex facing the viewpoint direction in the location parameter; and projecting the all edges facing the viewpoint direction outward according to the length of the expanded edge, to form the expanded edge, and obtain the profile of the expanded object.

8. A non-transitory computer readable medium containing program instructions for image processing, wherein execution of the program instructions by one or more processors of a computer system causes the one or more processors to perform:

performing edge expansion on an object in a scene according to a location parameter to obtain a profile of an expanded object, the location parameter being a relative location parameter of the object in the scene from a viewpoint, by:

traversing all triangular elements of the object in the scene;

storing three edges of the triangular elements facing a viewpoint direction into a stack;

when a duplicate edge exists in the stack, deleting the duplicate edge, to obtain all edges facing the viewpoint direction; and projecting the all edges facing the viewpoint direction outward according to the location parameter, to form an expanded edge and obtain the profile of the expanded object;

identifying a circle of confusion (COC) value of a vertex of the object as a COC value of a corresponding vertex of the profile of the expanded object;

down-sampling a view of the object in the scene, to obtain a first target view and a second target view, a size of the first target view being different than a size of the second target view; and obtaining a first texture of the object in the first target view by using a first filter, obtaining a second texture of the object in the second target view by using a second filter, the first filter being different than the second filter, and a COC value of the first texture being different than a COC value of the second texture;

determining a color of each pixel of the expanded object according to the COC value of the corresponding vertex and the first texture and the second texture of the object; and displaying the expanded object based on the color of each pixel.

9. The non-transitory computer readable medium according to claim 8, wherein the projecting the all edges facing the viewpoint direction outward according to the location parameter, to form an expanded edge, and obtain the profile of the expanded object comprises:

determining a length of the expanded edge according to a COC value of each vertex facing the viewpoint direction in the location parameter; and projecting the all edges facing the viewpoint direction outward according to the length of the expanded edge, to form the expanded edge, and obtain the profile of the expanded object.

10. An image processing method, comprising:
performing edge expansion on an object to obtain a profile of an expanded object viewpoint, by:
  traversing all triangular elements of the object in the scene;
  storing three edges of the triangular elements facing a viewpoint direction into a stack;
  when a duplicate edge exists in the stack, deleting the duplicate edge, to obtain all edges facing the viewpoint direction; and
  projecting the all edges facing the viewpoint direction outward to form an expanded edge and obtain the profile of the expanded object;
down-sampling a view of the object, to obtain a first target view and a second target view, a size of the first target view being different than a size of the second target view; and
obtaining a first texture of the object in the first target view by using a first filter, obtaining a second texture of the object in the second target view by using a second filter, the first filter being different than the second filter, a circle of confusion (COC) value of the first texture being different than a COC value of the second texture; and
determining a color of each pixel of the expanded object according to the first texture and the second texture of the object.

* * * * *